(12) United States Patent
Bauer et al.

(10) Patent No.: US 8,964,359 B2
(45) Date of Patent: Feb. 24, 2015

(54) MEDICAL CARE UNITS FOR POWER SUPPLY AND/OR DATA TRANSMISSION

(75) Inventors: Georg Bauer, Dachau (DE); Juergen Brunner, Berg (DE); Eberhard Holz, Tuebingen (DE); Thomas Weisheit, Munich (DE)

(73) Assignee: Trumpf Medizin Systeme GmbH + Co. KG, Saalfeld (DE)

( * ) Notice: Subject to any disclaimer, the term of this patent is extended or adjusted under 35 U.S.C. 154(b) by 1751 days.

(21) Appl. No.: 12/266,923

(22) Filed: Nov. 7, 2008

(65) Prior Publication Data

US 2009/0201632 A1 Aug. 13, 2009

(30) Foreign Application Priority Data

Nov. 8, 2007 (DE) .................. 10 2007 053 327

(51) Int. Cl.
*H02B 1/26* (2006.01)
*H02G 3/04* (2006.01)

(52) U.S. Cl.
CPC .................. *H02G 3/0493* (2013.01)
USPC ....................................... 361/624

(58) Field of Classification Search
CPC ............................................. H02B 1/26
USPC ........................................... 361/624
See application file for complete search history.

(56) References Cited

U.S. PATENT DOCUMENTS

| 4,067,257 | A | | 1/1978 | Pentith |
| 5,196,987 | A | | 3/1993 | Webber et al. |
| 5,383,090 | A | | 1/1995 | Freundner et al. |
| 5,625,537 | A | * | 4/1997 | Neuder ......................... 361/775 |
| 5,884,919 | A | * | 3/1999 | Saito .............................. 277/562 |
| 6,445,571 | B1 | * | 9/2002 | Inniss et al. .................. 361/624 |

FOREIGN PATENT DOCUMENTS

| DE | 2522321 | | 2/1976 |
| DE | 2618229 | | 11/1977 |
| DE | 8906303.1 | | 11/1989 |
| DE | 4110251 | | 4/1993 |
| DE | 4239625 | | 8/1993 |
| DE | 29505072 | U1 | 12/1996 |
| DE | 29616329 | | 1/1997 |
| DE | 4312682 | | 4/1998 |
| DE | 20315402 | | 5/2004 |
| DE | 20315402 | U1 * | 5/2004 |
| GB | 1537609 | | 1/1979 |
| WO | WO9950587 | A1 | 10/1999 |

* cited by examiner

*Primary Examiner* — Cherie M Stanfield
(74) *Attorney, Agent, or Firm* — Fish & Richardson P.C.

(57) ABSTRACT

A medical care unit provides power supply or data transmission in medical apparatuses. In particular, current consumers and data transmission apparatuses are slidable along a coupling device of the medical care unit. The medical care unit includes an oblong support that includes the coupling device, which extend along the support and include at least two electrically insulated bus bars continuously extending in the coupling device. At least two bus bars are formed as power supply bus bars, at least one bus bar is formed as a data transmission bus bar, the coupling device as a hollow bar is formed with an opening along its longitudinal direction, and the power supply bus bars and the data transmission bus bars are arranged inside the hollow bar.

17 Claims, 8 Drawing Sheets

MEDICAL CARE UNITS FOR POWER SUPPLY AND/OR DATA TRANSMISSION

CROSS REFERENCE TO RELATED APPLICATION

This application claims priority under 35 U.S.C. §119(a) to German Application No. 10 2007 053 327.8, filed on Nov. 8, 2007, the entire contents of which are hereby incorporated by reference.

TECHNICAL FIELD

The invention relates to a medical care unit for power supply and data transmission in medical apparatuses in which current consumers and data transmission apparatuses are continuously slidable along a coupling device of the medical care unit.

BACKGROUND

In the medical field, in particular, in intensive care or in surgery, it is required to operate and arrange a plurality of electric and electronic medical apparatuses in a small space in a way that they are, on the one hand, located near a patient, and that they do not hamper the patient on the other hand. Such medical apparatuses are typically mobile to a certain extent, as are the power supply and, if necessary, the data transmission terminals for those medical apparatuses.

Mobile support devices for medical apparatuses include a coupling device to be connected with medical apparatuses for power supply and for data transmission. For instance, document DE 42 396 25 C1 shows a mobile support device for medical apparatuses having a coupling device for power supply for the medical apparatuses and for data transmission.

SUMMARY

A medical care unit is designed to enable flexible power supply and mountability while maintaining the mobility even of bigger medical apparatuses and consumers that need a low voltage power supply as well as a stronger attachment on the support.

According to one general aspect, a medical care unit for use in the medical field is disclosed and includes an oblong support and a coupling means, the coupling means extends along the support and includes at least two electric insulated bus bars continuously extending in the coupling means. Further, the coupling means is formed as a hollow bar having an opening along the longitudinal direction thereof, and it is arranged inside the hollow bar.

If at least two bus bars are formed as power supply bus bars and at least one bus bar is formed as a data transmission bus bar, the medical care unit can inexpensively be manufactured with a minimum number of bus bars.

If three power supply bus bars, which are adapted to a low voltage power supply, are provided in the coupling means, and if two data transmission bus bars are provided, the connection of common power supply units having nationally common supply voltages can be connected, and shockproof sockets can be connected, where such shockproof sockets are connectable to standard shockproof plugs.

If the coupling means includes a guide portion, preferably in the shape of two opposed guide grooves, the mechanical load can be released from the bus bars on the one hand, and moreover, a medical apparatus or another current consumer can be securely and stationarily fixed at the coupling means.

Furthermore, by sliding the medical apparatus or the other current consumer along the coupling means, this apparatus can securely be guided, and tilting of the coupling means can be prevented from occurring.

If a cover device preferably in the form of one or two lips of an elastic material is provided along the opening, where the lips narrow or close the opening, an undesired contact with the power supply bus bars is further hindered on the one side, and on the other side, efficient dust and splatter protection is provided.

By separating the data transmission bus bars from the power supply bus bars, a data transmission is ensured even when a current consumer, which emits noises and distorts a data transmission signal, is connected to the power supply bus bars.

If the power supply bus bars and the data transmission bus bars are arranged to be opposed to each other on inner surfaces of the hollow bar, mutual inductive interferences can further be suppressed.

If the support is shaped as a block and includes four longitudinal edges, four longitudinal surfaces, and one inner space, and if at least one coupling means extends along one longitudinal edge and if at least one of the longitudinal surfaces of the support adjacent to the coupling means at the longitudinal edge is formed to receive replaceable module components in a modular system, a flexible medical care unit for power supply and for mounting different medical apparatuses and other devices such as power supply units and controllers or switches can be provided.

If the support is designed in a way that at least two coupling means extend along a longitudinal edge, where one of the coupling means as an inner coupling means is accessible from the inner space and at least one outer coupling means is accessible outside of the support, the possibility of mounting a freely slidable consumer on the outer coupling means is maintained while modular components are connected to the inner coupling means. The supply of the outer and inner coupling means can be carried out by different circuits.

If the medical care unit includes a fixing device, for example, in the form of fixing rivets for fixing the modular components, it is possible to provide a modular medical care unit for power supply or for retaining controllers or medical apparatuses, for instance.

Different assemblies of medical care units can be embodied as a support. By integrating the coupling means in cantilever arms of ceiling mounted support systems or bus systems of ceiling bars, for instance, medical electric apparatuses or system components can be also attached and supplied here.

A system component in the medical field is also disclosed here, where the system component includes a coupling part, and the coupling part includes at least two contact parts that are insulated from each other and one insulating body that electrically insulates the coupling parts from each other. At the same time, the system component is adapted to be coupled with a coupling means, which is designed as a hollow bar having inner bus bars as power supply bus bars and data transmission bus bars. Here, the contact parts are formed to establish a conductive contact with each bus bar in the coupled state and to be slideable along the bus bar.

If three contact parts are provided as power supply contact parts adapted to contact the power supply bus bars, and if these contact parts are adapted to low voltage power supply, they can be connected with common power supply units.

If two contact parts are provided as data transmission contact parts adapted to contact the data transmission bus bars, the system component or apparatuses connected with the system component can perform data transmission via the data transmission bus bars. If power supply parts and data transmission parts are disjunctive to each other, interferences in the wires of the electrical apparatuses do not affect the data transmission.

If the power supply contact parts are opposed to the data trans-mission contact parts with respect to the coupling part, mutual interferences can be further suppressed.

If the system component comprises a guide component adapted to be guided in the guide portion, the system component can surely be guided along the coupling means and mechanical load can be released from the bus bars.

If the guide component is stationarily fixed in the guide portion by changing the position or the alignment of the guide component relative to the support, system components having higher weight or higher mechanical load such as a grip for guiding can also be mounted to the support.

If the system component is formed as a module component adapted to be modularly inserted in the support, and if the module component comprises a front surface adapted to form a part of the longitudinal surface in a state where the modular component is inserted in the support, a modular construction of the support for assembly, power supply and controlling of electrical apparatuses is enabled. Stations for withdrawal of mediums such as liquids or medical gases can also be incorporated in the module components.

If the module component includes a counter-fixing part adapted to stationarily fixing the module component with the fixing device relative to the support, preferably by a hook which can engage with the fixing groove, modular mounting and removal of module components is enabled herewith. The module components can comprise at least one switch or at least one controller in the front surface.

A system component can be mounted via the coupling means, wherein the system component may release or activate a break of the medical care unit.

The stationary fixing can further be enhanced by a counter-fixing part at the backside of the hollow bar, in particular when the counter-fixing part is formed with recesses or holes in which the coupling part engages.

A system of the above mentioned medical care unit and the above mentioned system components is also disclosed.

In one general aspect, a medical care unit for medical use includes an oblong support extending along a longitudinal direction, and at least one coupling device that extends longitudinally along the support and includes at least two electric insulated bus bars continuously extending in the coupling device. The coupling device is formed as a hollow bar having an opening extending along the longitudinal direction, and the bus bars are arranged inside the hollow bar.

Implementations can include one or more of the following features. For example, at least two bus bars can be formed as power supply bus bars, and at least one bus bar can be formed as a data transmission bus bar.

The at least two electric insulated bus bars can include at least three power supply bus bars adapted to low voltage power supply, and at least two data transmission bus bars.

The coupling device can include a guide portion extending longitudinally along the coupling device. The guide portion can include at least one guide groove extending inside the coupling device.

The medical care unit can include a cover device provided along the opening. The cover device can include at least one lip of an elastic material, where the lip narrows or closes the opening.

The power supply bus bars can be opposed to the data transmission bus bars at inner surfaces of the hollow bar.

The support can be block-shaped and can include four longitudinal corners, four longitudinal surfaces, and an inner space, at least one coupling device can extend along a longitudinal corner, and at least one of the longitudinal surfaces of the support adjacent to the coupling device at the longitudinal corner can be formed to receive replaceable module components in a modular system. The at least two coupling devices can extend along one longitudinal corner, an inner coupling device can be accessible from the inner space, and at least one outer coupling device can be accessible from outside the support. The support can include a fixing device for fixing at least one of the module components. The fixing device can include at least one fixing groove.

The medical care unit can be a ceiling mounted support system. The medical care unit can be a ceiling bar. The medical care unit can be a wall bar.

In another general aspect, a system component can be used in the medical care unit. The system component can include a coupling part that includes at least two contact parts being insulated from each other, and an insulating body that electrically insulates the contact parts from each other, and the coupling part can be adapted to be coupled with the coupling device. The contact parts can electrically contact the bus bars in a state in which the coupling part is coupled with the coupling device, and are slidable along the bus bars.

The three contact parts can be provided as power supply contact parts adapted to contact the power supply bus bars and adapted to low voltage power supply. The two contact parts can be provided as data transmission contact parts adapted to contact the data transmission bus bars. The power supply contact parts and the data transmission contact parts can be opposed to each other with respect the coupling part.

The system component can include a guide component adapted to be guided in the guide portion arranged in the coupling device. The guide component and the guide portion can be configured to stationarily fix the coupling part relative to the coupling device by changing the position or alignment of the guide component.

The system component can be in the shape of a module component for use in the medical care unit and adapted to be incorporated in the support in a modular system. The module component can include a front surface adapted to form a part of the longitudinal surface in a state in which the module component is inserted in the support.

The module component can include a counter fixing part adapted to engage with the fixing device and stationarily fixing the module component relative to the support. The module component can be for use in the medical care unit, where the counter fixing part can be a hook engageable with the fixing groove.

The front surface of the module component can include at least one socket for low voltage power supply.

The front surface of the module component can include a switch, a controller, a power supply socket, a current control device, or control devices, to be connected with the coupling device.

In another general aspect, a system includes a medical care unit and a system component connected to the medical care unit. The medical care unit includes an oblong support extending along a longitudinal direction, and at least one coupling device that extends longitudinally along the support and comprises at least two electric insulated bus bars continuously extending in the coupling device, where the coupling device is formed as a hollow bar having an opening extending along the longitudinal direction, and the bus bars are arranged inside the hollow bar. The system component includes a coupling part that is connected to the coupling device of medical care unit.

Implementations can include one or more of the following features. The coupling part of the system component can include at least two contact parts insulated from each other, and an insulating body that electrically insulates the contact parts from each other. And, the coupling part can be adapted to be coupled with the coupling device, and the contact parts can electrically contact the bus bars in a state in which the coupling part is coupled with the coupling device, and are slidable along the bus bars.

The coupling device can be provided with a counter fixing part designed to engage with the coupling part.

In another general aspect, a medical care system for medical use is made by extending an oblong support along a longitudinal direction; forming in the oblong support at least one coupling device as a hollow bar that defines an internal opening extending along the longitudinal direction; arranging at least two electric insulating bus bars within the opening to extend continuously along the longitudinal direction of the coupling device; and extending the at least one coupling device longitudinally along the support.

Implementations can include one or more of the following features. The at least two electric insulating bus bars can be arranged by forming at least two bus bars as power supply bus bars, and forming at least one bus bar as a data transmission bus bar.

The at least one coupling device can be formed by forming a guide portion to extend longitudinally along the coupling device.

A cover device can be provided along the opening. The support can be mounted to a ceiling with a ceiling mounted support system. A system component can be attached to the support by inserting a coupling part of the system component into the coupling device.

The coupling part can be inserted into the coupling device by electrically contacting contact parts of the coupling part to the bus bars, where the contact parts are insulated from each other by a center insulating body of the coupling part. The coupling part can be inserted into the coupling device by sliding the coupling part into the coupling device and then rotating the coupling part 90° to lock the coupling part in the coupling device by rotating a guide component of the coupling part into a guide portion arranged in the coupling device.

The system component can be attached to the support by engaging a counter fixing part of the system component with a fixing groove formed in the support.

DETAILED DESCRIPTION

The overall construction of a medical care unit 1 is roughly described with reference to FIG. 1.

Figure 1:
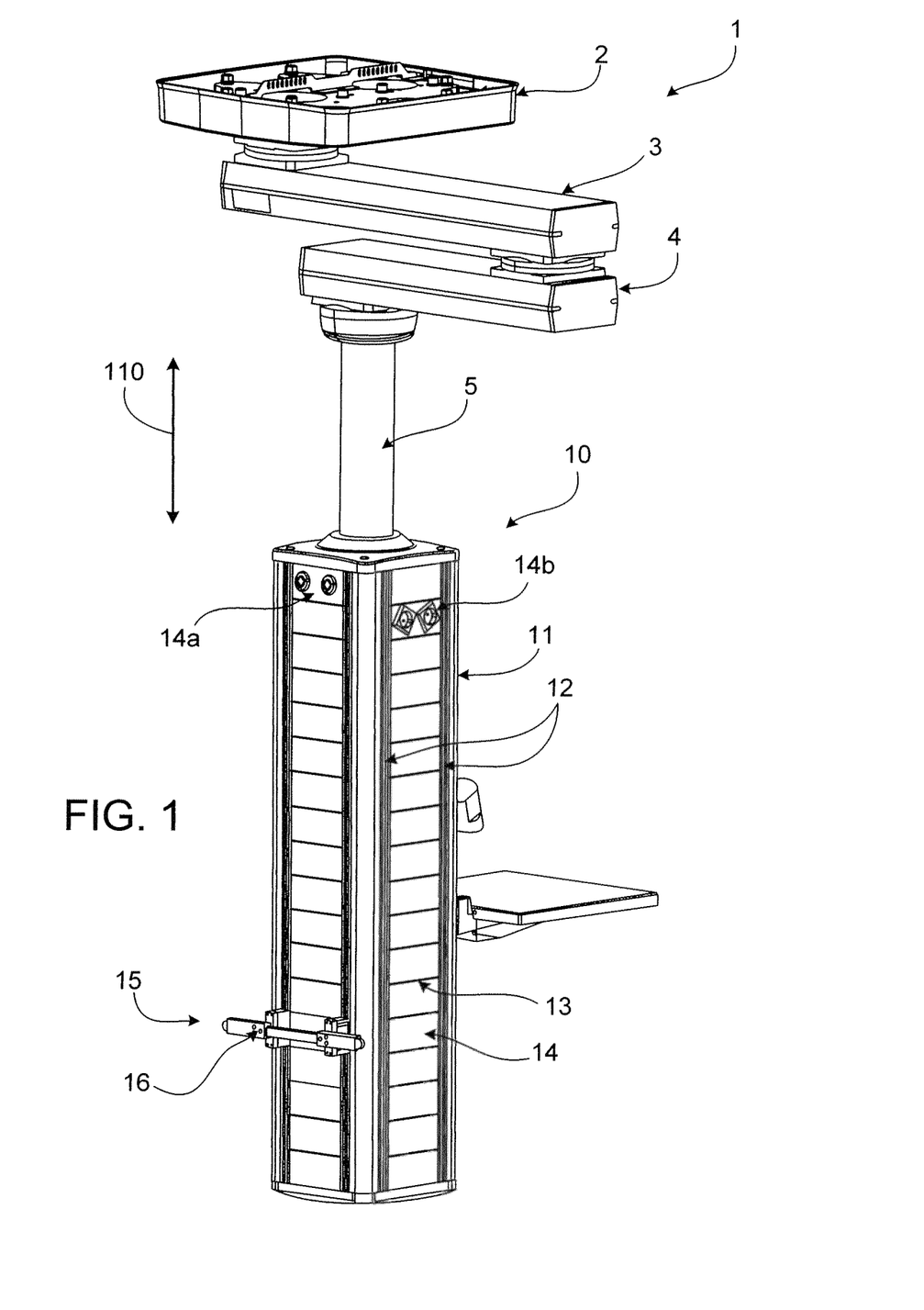
FIG. 1 is a perspective view of a ceiling mounted medical care unit.

Referring to FIG. 1, the medical care unit 1 includes a ceiling fixing device 2 for fixing the medical care unit 1 at a mounting site at the ceiling. A first cantilever arm 3 is connected at one of its ends with the ceiling fixing device 2 through a rotating axis that is parallel with a vertical direction such that the first cantilever arm 3 is pivotable relative to the ceiling fixing device 2 about the rotating axis in a horizontal direction. The alignment between the ceiling fixing device 2 and the first cantilever arm 3 can be fixed by a not-shown first break mechanism, and pivoting can be suppressed. A second cantilever arm 4 is connected at one of its end with the other end of the first cantilever arm 3 through a rotating axis that is parallel with the vertical direction such that the second cantilever arm 4 is horizontally pivotable about the rotating axis relative to the first cantilever arm 3. The alignment between the first cantilever arm 3 and the second cantilever arm 4 can be fixed by a not-shown second break mechanism. At the other end of the second cantilever arm 4, a distance pillar 5 is arranged to extend vertically downwards from the second cantilever arm 4. The distance pillar 5 is mounted on the second cantilever arm 4 to be rotatable about its central axis. A rotational alignment of the distance pillar 5 relative to the second cantilever arm 4 can be fixed by a not-shown third break mechanism.

A block-shaped oblong support 10 is arranged at the lower end of the distance pillar 5. The support 10 includes four corners 11 that extend generally along a longitudinal direction 110. Coupling means such as coupling bars 12 extend along the longitudinal corners 11. Further, the support 10 includes four longitudinal surfaces 13 divided into a plurality of module components 14. One module component 14a is depicted including two sites for gas withdrawal, and one module component 14b has two shockproof sockets for common national low voltage power supplies. Further, a system component in the shape of a grip 15 having operation knobs 16 is mounted on the support 10 through two coupling means. The break mechanisms for fixing of the first cantilever arm 3, the second cantilever arm 4 and the distance pillar 5 can be released and activated by the operation knobs 16. The position of the support 10 can be changed by the grip 15, when the break mechanism is released.

Details of the support 10 are described as follows with reference to FIGS. 2-7.

Figure 2:
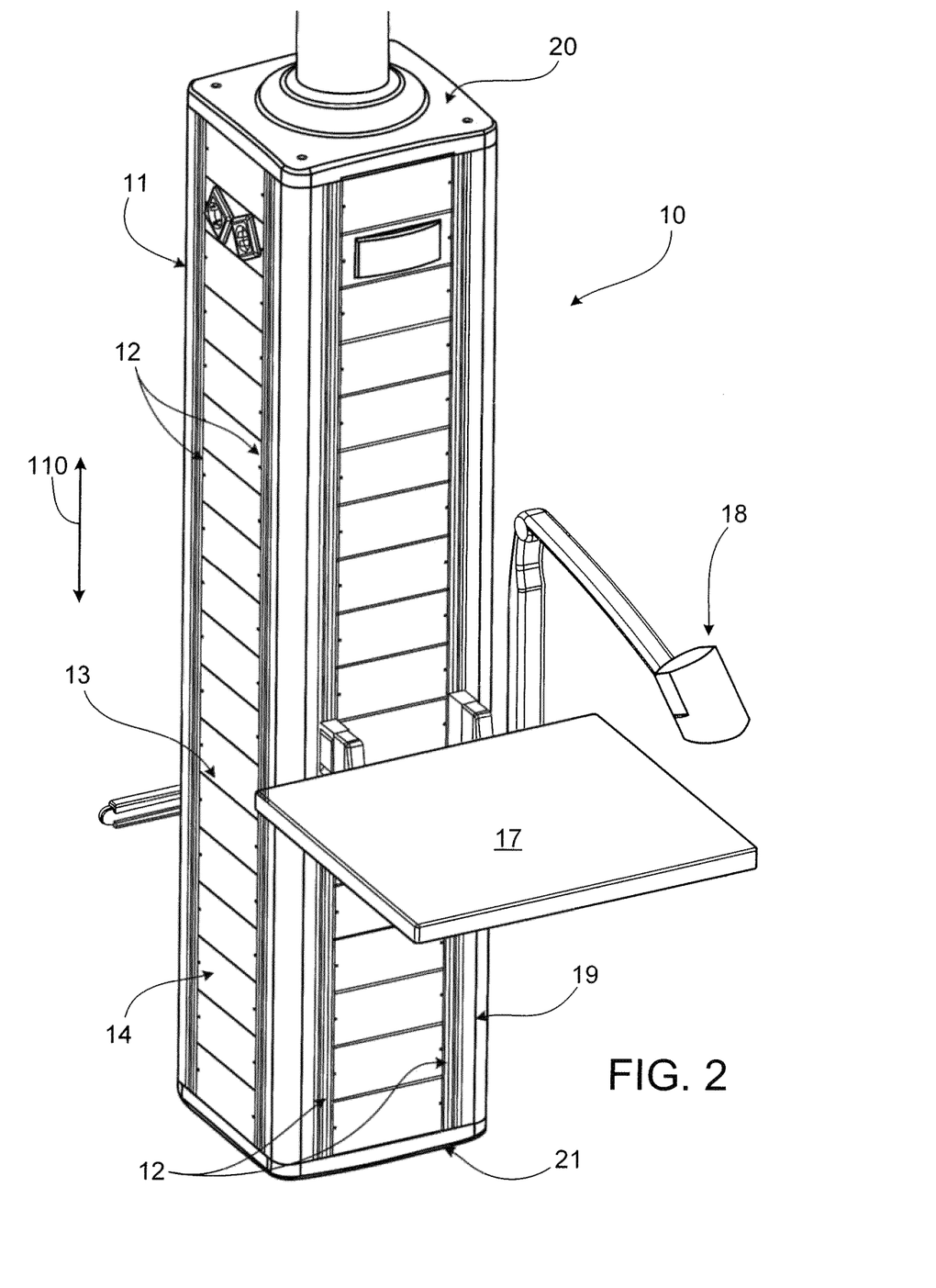
FIG. 2 is a perspective backside view of a block-shaped oblong support of the medical care unit of FIG. 1.

FIG. 2 shows that further system components in the shape of a tray 17 and a lamp 18 are mounted on the support 10 by way of the coupling bars 12. Furthermore, two coupling bars 12 are arranged along respective longitudinal corners 11 at the edge of the longitudinal surfaces 13. Each of the four longitudinal corners 11 is formed of an extruded profile bar 19 of aluminum that is screwed to an upper plate 20 and a lower plate 21 such that a stable framework in a block shape is formed together with the plates 20, 21.

Figure 3:
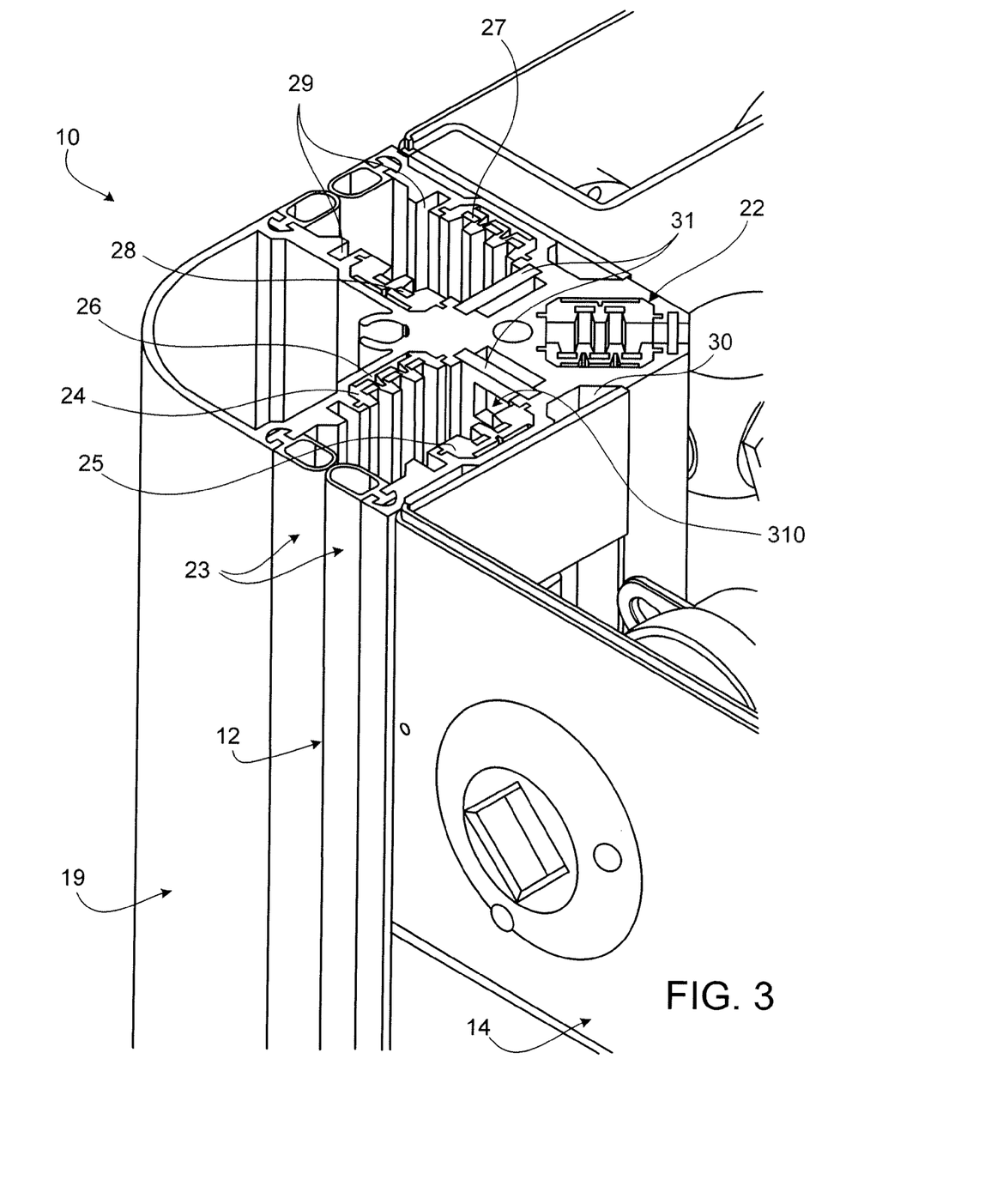
FIG. 3 is a perspective view of a portion of the support of FIGS. 1 and 2.
Figure 4:
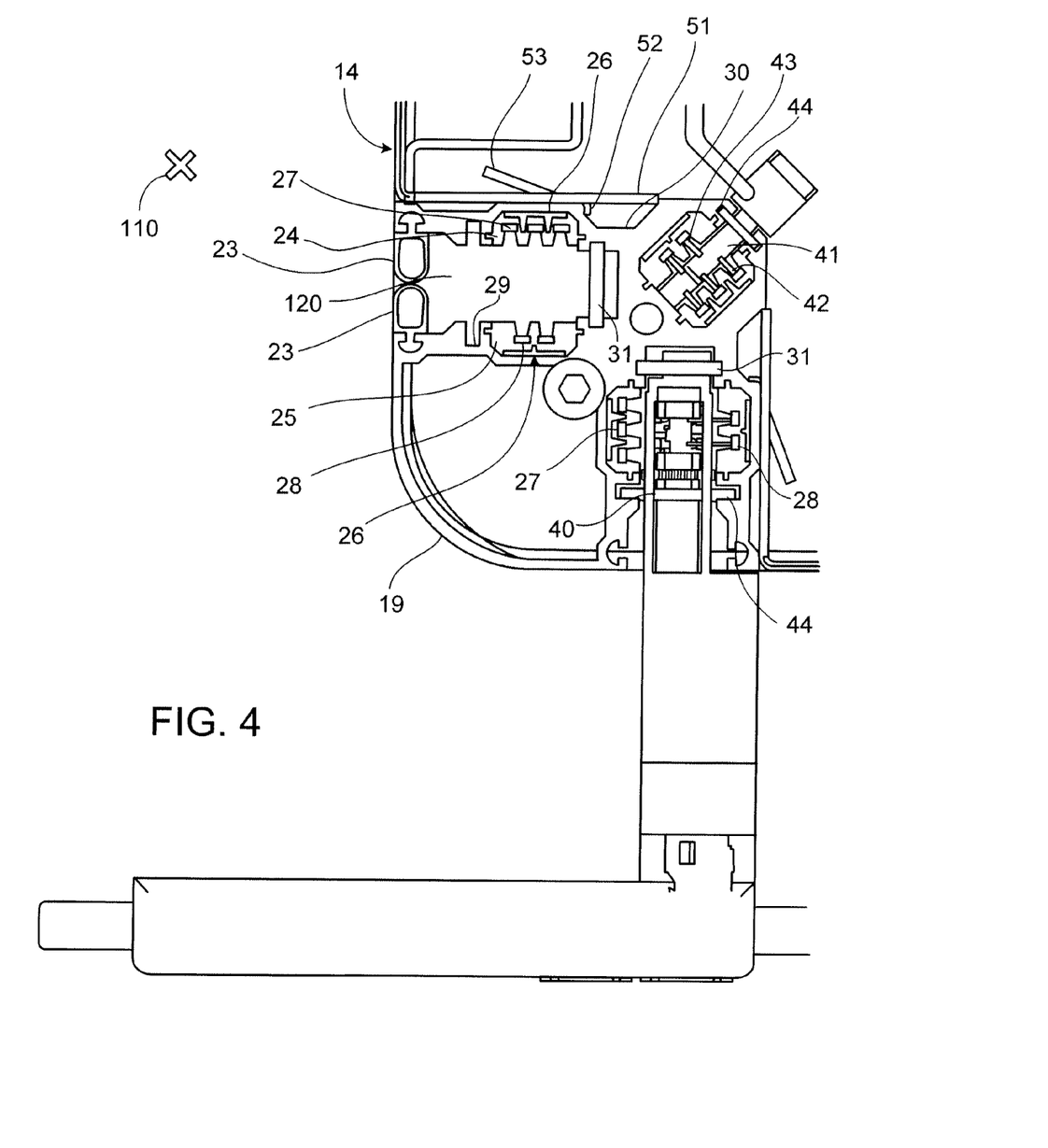
FIG. 4 is a cross-sectional view of a portion of the support of FIGS. 1-3 taken perpendicularly to a longitudinal direction of the support.

FIG. 3 shows a portion of FIG. 2 including an upper end of one of the profile bars 19. FIG. 4 shows the same portion in a longitudinal cross sectional view. The profile bar 19 includes two coupling means in the shape of outer coupling bars 12 and one coupling means in the shape of an inner coupling bar 22.

In the following, the outer coupling bars 12 are described.

The coupling bars 12 are hollow bars formed in the profile bars 19 and extending generally along the longitudinal direction 110. The coupling bar 12 define an opening 120 at the outside of the support 10, and the opening 120 extends as a gap along the profile bar 19.

An elastic (for example, rubber) lip 23 extends along each side of the gap in the direction to the center of the gap so far that this gap is closed by the rubber lips 23. Foreign matters, dirt, or liquids, which may cause a short circuit or rough-running of mechanic parts within the profile bars 19, are substantially prevented from entering the opening 120 of coupling bar 12. The lips 23 can be opened by applying a low force such that a coupling part 40, which is described later, may pass through and into the opening 120 since the rubber lips 23 are elastic and have a hollow profile.

The coupling bar 12 includes a first insulating body 24 and a second insulating body 25 on two opposing sides of the opening 120. The insulating bodies 24, 25 are fixed by key and slot joint in respective receiving grooves 26 extending along the longitudinal direction of the coupling bar 12 on opposing sides of the coupling bar 12. The insulating bodies 24, 25 have a comb-shaped longitudinal cross sectional profile.

Power supply bus bars 27 in the insulating body 24 and data transmission bus bars 28 in the insulating body 25 are arranged along valleys of the comb-shaped areas. The three power supply bus bars 27 are a protective conductor, a neutral conductor, and a phase conductor, respectively. At the power supply bus bars 27, the national alternating current of (for example, 230 V having 50 Hz in Europe or 120 V having 60 Hz in North America) is applied. The data transmission bus bars 28 provide an EIA-485-bus interface, which is an electrical specification of a communication channel.

Two guide grooves 29 as a guide portion are provided in the coupling bar 12 and extend between the first and second insulating body 24, 25, respectively, and the lips 23 along the opposed sides of the coupling bar 12. The guide grooves 29 are configured to receive a guide component 44, which is described later.

At the side opposite to the opening 120 of the coupling bar 12, a positioning bar 31 (for example, of steel) is inserted into two grooves as a counter-fixing part. The positioning bar 31 has approximately the same longitudinal length of and a width (perpendicular to the longitudinal direction) that is slightly smaller than the width of the coupling bar 12. The depth of the positioning bar 31 is a fractional amount of the its width. In the width surface, the positioning bar 31 has a plurality of a rectangular punched holes 310 (shown in FIG. 3) extending along its longitudinal direction at uniform intervals. The positioning bars 31 are configured to fix and position a system component such as the grip 15 or the tray 17, as described below.

The inner coupling bar 22 has basically the same structure as the coupling bar 12, however, the inner coupling bar lacks rubber lip 23 and a positioning bar 31, and its guide grooves 29 are smaller-sized.

As shown in FIGS. 3 and 4, the module components 14, which are described later in detail, adjoin to the profile bars 19. A fixing device in the shape of a fixing groove 30 is provided along an outer surface of the profile bar 19 between the coupling bar 12 and the inner coupling bar 22 to fix the module component 14 to the profile bar 19.

Next, the system components and the module components 14 are described.

Figure 5:
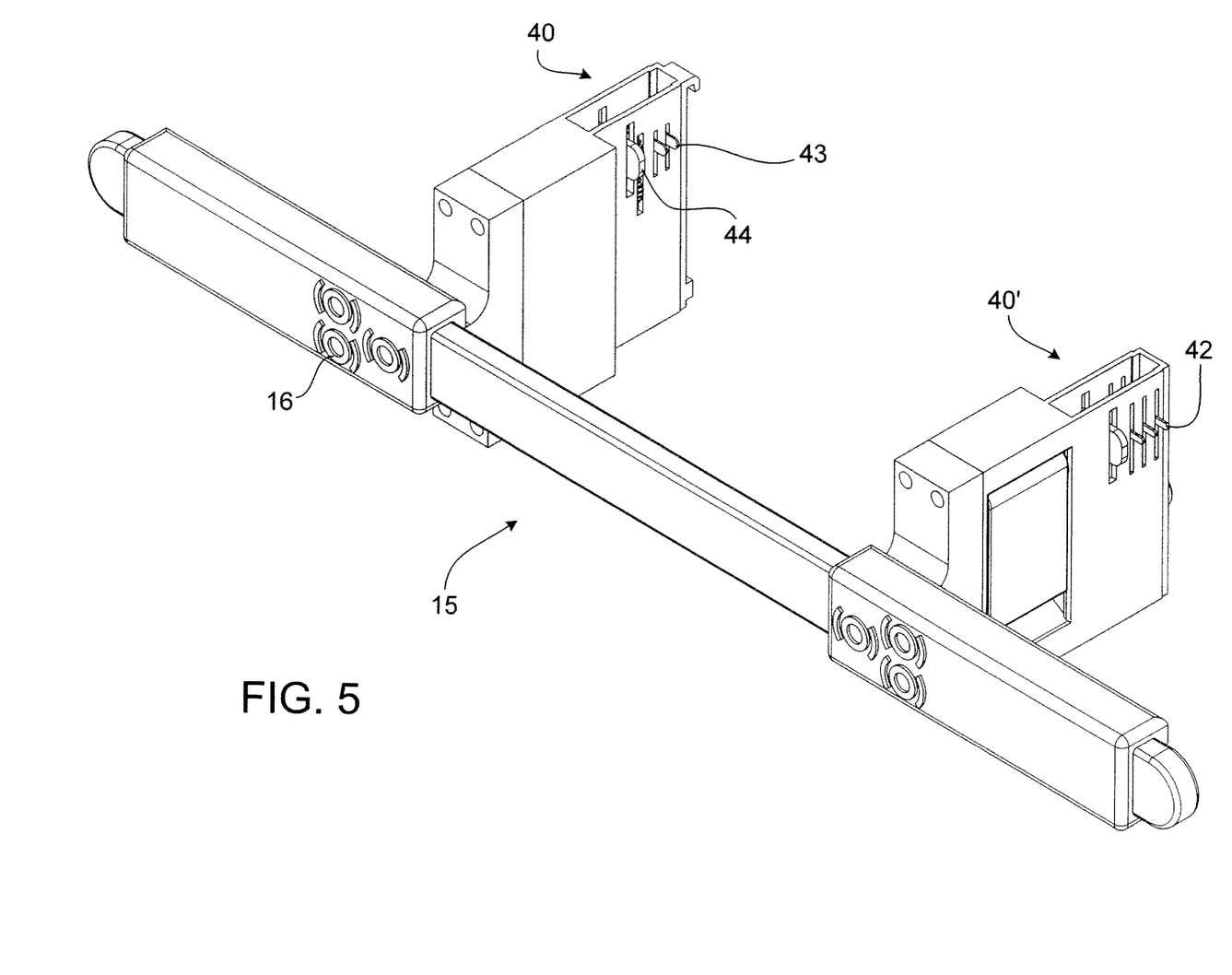
FIG. 5 is a perspective view of a grip of the support of FIGS. 1-4.
Figure 6:
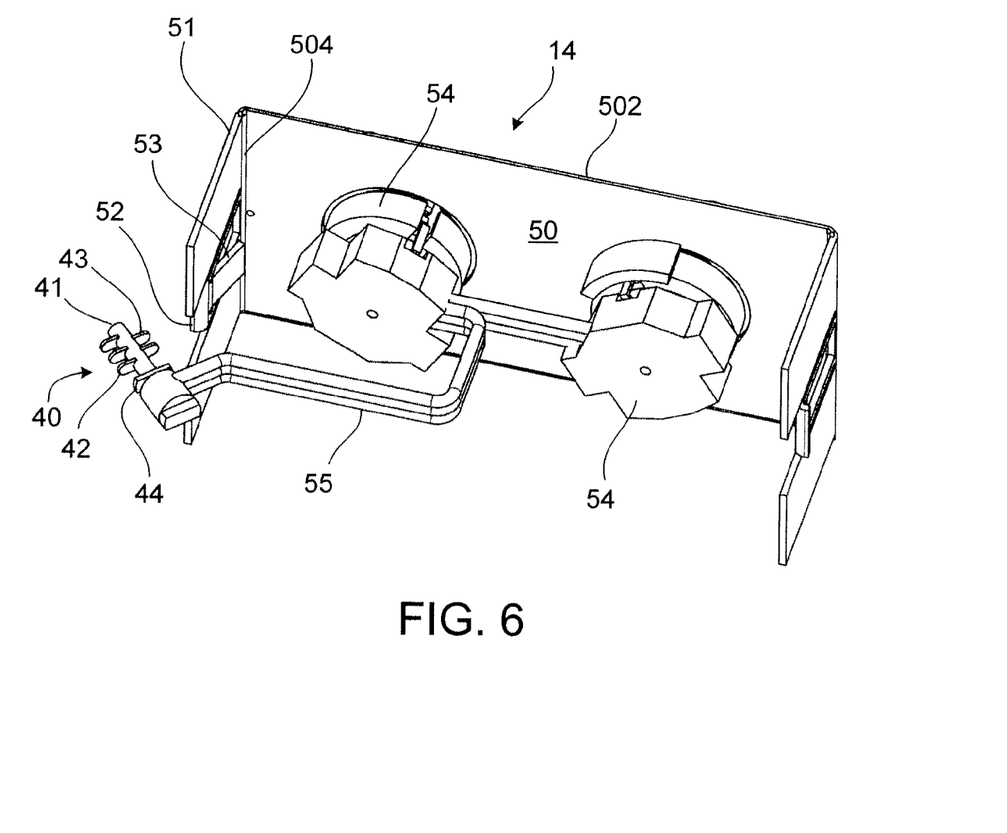
FIG. 6 is a perspective view of a portion of a module component of the support of FIGS. 1-4.
Figure 7:
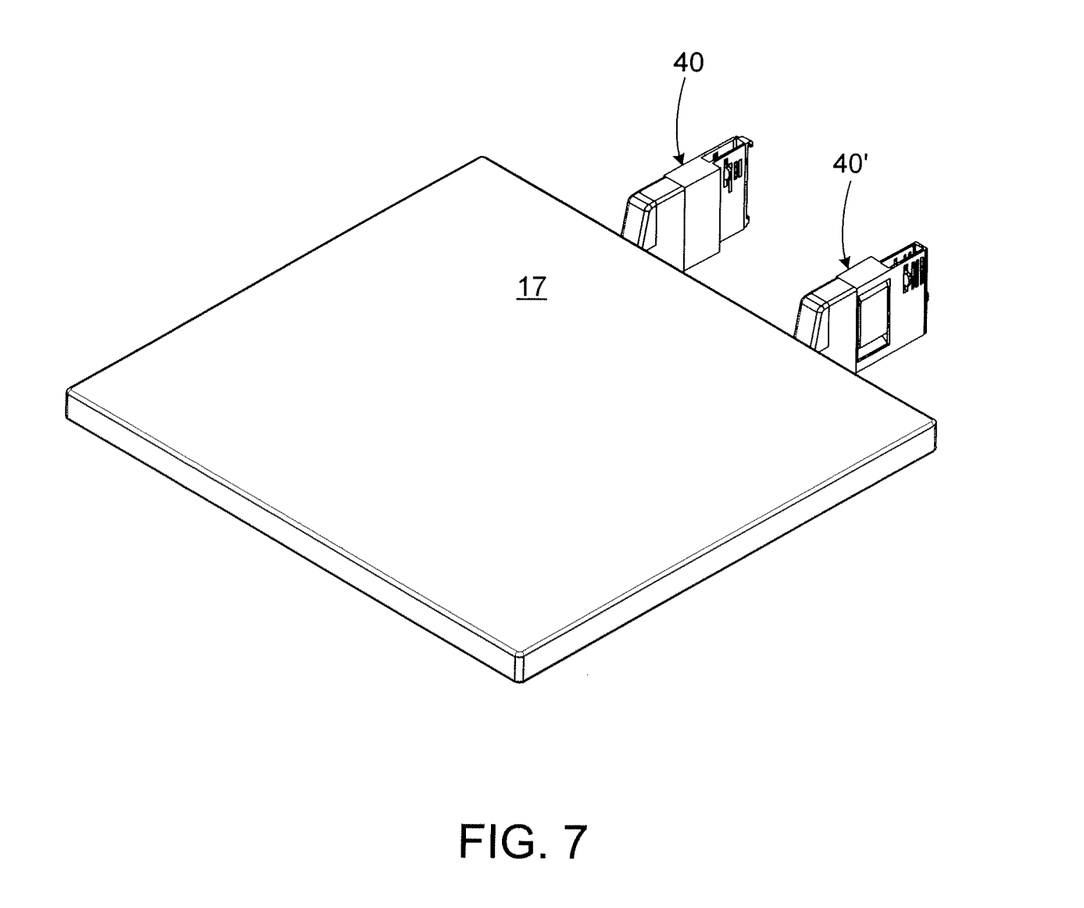
FIG. 7 is a perspective view of a tray of the support of FIGS. 1-4.

A system component such as the grip 15 as shown in FIG. 5, the tray 17 as shown in FIG. 7, or the module component 14 as shown in FIG. 6 include a coupling part 40 adapted to be slidably coupled with the coupling bar 12 or 22. The coupling part 40 consists of a coupling part insulating body 41, which is sized to be freely moveable within the coupling bars 12, 22. Contact parts in the shape of three power supply contact parts 42 and two data transmission contact parts 43 are arranged on the coupling part insulating body 41. The contact parts 42 and 43 are formed to keep contact with, respectively, the power supply bus bars 27 and the data transmission bus bars 28 when the coupling part 42, 43 is slid within the coupling bars 12, 22. Furthermore, the coupling part 42, 43 of this embodiment includes a guide component 44 that is block-shaped or block-shaped having rounded edges, and can be slid in and along the guide groove 29. The guide component 44 is configured to bear a mechanical load through the guide component 44 and the guide groove 29, when the mechanical load is applied to the coupling parts 40 as the coupling parts 40 are slid into the coupling bars 12, 22, so that the bus bars 27, 28 are mechanically released in this case.

Figure 8:
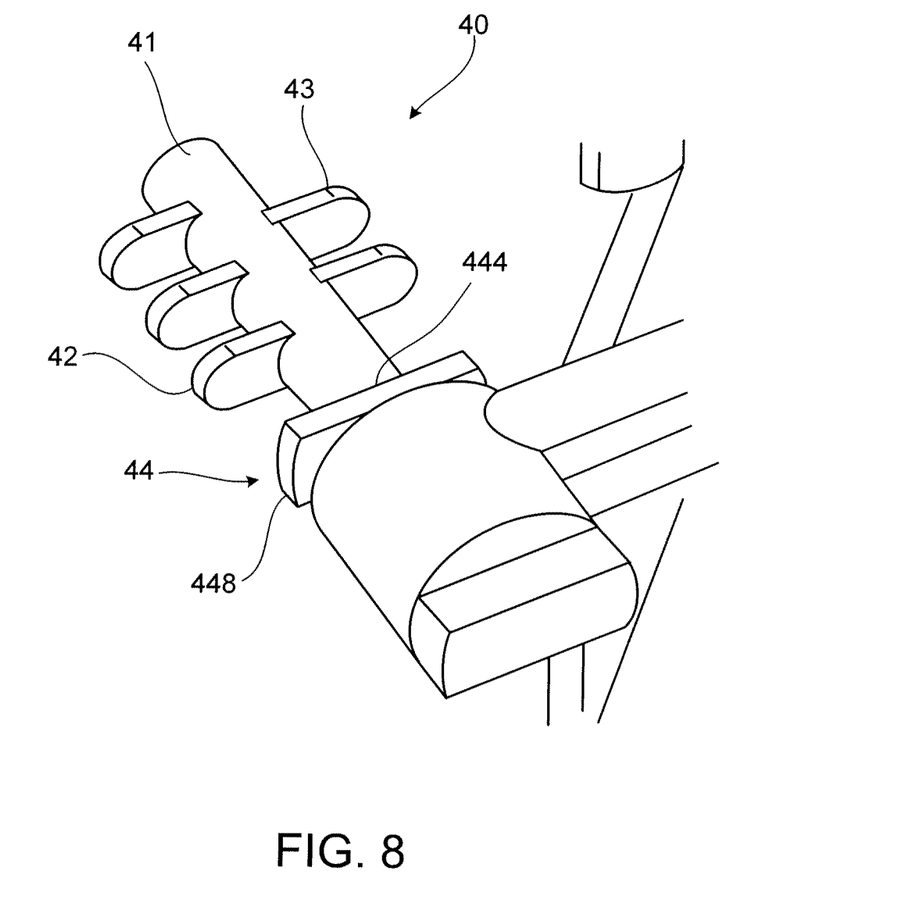
FIG. 8 is a perspective view of a coupling part used to the mount the devices of FIGS. 5-7 to the support of FIGS. 1-4.

Referring also to FIG. 8, the power supply contact parts 42 and the data transmission contacts parts 43 are arranged opposite to each other with respect to the coupling part insulating body 41, and the guide component 44 at the coupling part insulating body 41 has two opposing sectors 444 and two opposing sectors 448, where the two opposing sectors 444 have a diameter that is smaller than the diameter of the two opposing sectors 448. The sectors 444 are twisted by 90° with respect to the contact parts 42, 43. By aligning the coupling part insulating bodies 41 such that the contact parts 42, 43 and the sectors 448 of the guide components 44 having a larger diameter are parallel to the longitudinal direction 110 of the coupling bar 12, the coupling part 40 can be inserted up to the stopper on the wall opposite to the opening of the coupling bar 12. By twisting the coupling part insulating bodies 41 with the contact parts 42, 43 and the guide component 44 by 90°, the contact between the contact parts 42, 43 and the bus bars 27, 28 is closed, and the coupling part 40 is form-locked in the guide groove 29 by means of the guide components 44. Furthermore, the guide component 44 can be shifted by screwing relative to the coupling part 40, so that the coupling part 40 is supported on the backside of the coupling bars 12, 22 or the positioning bar 31, and the guide component 44 is pressed to the side of the guide grooves 29. The coupling part 40 is fixed in place in the coupling bars 12, 22 by the thus generated friction. Alternatively to the friction, fixing can be performed by form-locking of a corresponding profile of the guide grooves 29. Form-locking can be achieved by shaping the coupling part 40 in a way that it protrudes at least partly into the punched holes of the positioning bar 31 after fixing.

FIGS. 4 and 5 show the grip 15 having the operation knobs 16 as an example of the system component. Since it does not need any power supply, or this power supply is achieved by a further coupling part 40' shown in FIG. 5, the coupling part 40 has no power supply contact parts 42 in this case, but only data transmission contact parts 43. By operating the operating knobs 16, a corresponding data transmission signal is transmitted to the data transmission bus bars 28 through the data transmission contact parts 43. A control apparatus, which is not shown, is also connected to the data transmission bus bars 28 and operates the break mechanism of the first cantilever arms 3, the second cantilever arms 4, and the distance pillar 5. If a corresponding control signal is received by this control apparatus through the data transmission bus bars 28, the break mechanisms are released and activated, respectively, so that the support 10 can be switched between a fixed state and a moveable state.

In the following, the module component 14 as shown in FIG. 6 is described.

The module component 14 is a system component having a coupling part 40, and it is further designed to be inserted in one of the longitudinal surfaces 13 of the support 10 as a module (see FIG. 1).

The module component 14 has a rectangular front surface 50 having two oblong edges 502 and two short edges 504 designed to form a part of the longitudinal surface 13 of the support 10. At its short edges 504, holding surfaces 51 vertically extend to the front surface 50 such that they are U-shaped together with the front surface 50. A counter-fixing part in the shape of a fixing hook 52 is formed in each of the holding surfaces 51. The fixing hook 52 is designed to engage with the fixing groove 30 (see FIG. 3) and to prevent the module component 14 from falling out of the support 10. Undesired over-insertion of the module component 14 into the support 10 is prevented by the back edges of the holding surfaces 51 designed to abut on the backside of the fixing groove 30 (which is shown in FIG. 4). The engagement between the fixing hook 52 and the fixing groove 30 can be released by means of an elastic deformation of the fixing hook 52 using a lever 53, and the module component 14 can be removed from the support 10. In the front surface 50, there are two shock-proof sockets 54, i.e., the shown module component 14 is a socket module component 14b as shown in FIG. 1. The shock-proof sockets 54 are connected to connection wires 55, which connect with the contact parts 42 of the coupling parts 40, and the shock-proof sockets 54 are supplied with current from the three power supply bus bars 27, through the contact parts 42 and the connection wires 55.

Alternatively to the shock-proof sockets 54, switches or controllers can be mounted in the front surface 50, although they are not shown here. Switches or controllers need not be connected to the power supply bus bars 27 through the connection wires 55; rather, switches or controllers would be connected to the data transmission bus bars 28 through the connection wires and the contact parts 43, and the switches and controllers can therefore control and switch apparatuses having likewise a contact with the data transmission bus bars 28 and reacting on corresponding signals.

Modifications of the above-described embodiment are possible. The module components may not only be sockets, switches, and controllers, but medical apparatuses as infusion controls or others, which are supplied with energy through the power supply bus bars 27 and which are also controlled through the data transmission bus bars 28.

Further, instead of electric components, withdrawal sites for fluids such as medical gases can be incorporated as shown by the module component 14a.

Furthermore, the module components 14 can not only be attached to the support 10 by the described mechanism of the fixing grooves 30 and the hooks 52, but rather by means of screwing or clamping, for instance.

FIG. 7 shows an example of a tray 17 as a system component.

The tray 17 is a bent part of a steel plate having two coupling parts 40, 40' adapted to be slidably coupled with the coupling bar 12. Since no electrical components are included in the tray 17, there are no contacts parts 42, 43 on the coupling parts 40. The coupling part 40 is designed to at least partly protrude in the punched holes of the positioning bar 31 after fixing, thereby transmitting vertical forces.

The tray 17 can optionally be equipped with electric means such as shockproof sockets or switches. The contact parts 42, 43 are then incorporated in the coupling parts 40 for power supply.

The medical care unit 1 can be formed with less movable components to reduce costs, or it can have further degrees of freedom to enhance the mobility such as twistability about the longitudinal direction 110 of one of the cantilever arms 3 and 4.

Although the material of the rubber lips 23 is elastic, there are openings directly above and below the coupling parts 40 due to the remaining stiffness, where the openings pass through the rubber lips 23. These openings in turn can be closed by cover lugs attached on the upper and lower sides of the coupling parts 40.

Alternatively to the rubber lips 23, other cover means such as brushes or movable cover apertures can be used. Here, brushes are advantageous to facilitate sliding of the contact part 40, and movable cover plates are advantageous for better protecting against infiltration in the hollow bar in a state where the coupling bar 12 is not needed.

According to the requirements of stability, other metals or plastics can be used for the profile bar 19 instead of aluminum.

Separate data transmission bus bars can be omitted when the data transmission is carried out together with the power supply through the power supply bus bars, which leads to reduced costs and simplifies the coupling mechanism.

Other implementations are within the scope of the following claims.

What is claimed is:

1. A medical care unit for medical use, the medical care unit comprising:
   an oblong support extending along a longitudinal direction, and
   at least one coupling device that extends longitudinally along the support and comprises at least two electric insulated bus bars continuously extending in the coupling device,
   wherein the coupling device comprises a hollow bar having an opening extending along the longitudinal direction and a cover device provided along the opening of the hollow bar, the cover device comprising at least one lip that narrows or closes the opening, and
   wherein the bus bars are enclosed by the hollow bar and the cover device.

2. The medical care unit according to claim 1, wherein at least two bus bars are formed as power supply bus bars, and at least one bus bar is formed as a data transmission bus bar.

3. The medical care unit according to claim 1, wherein the at least two electric insulated bus bars comprise:
   at least three power supply bus bars adapted to low voltage power supply, and
   at least two data transmission bus bars.

4. The medical care unit according to claim 1, wherein the coupling device includes a guide portion extending longitudinally along the coupling device.

5. The medical care unit according to claim 4, wherein the guide portion comprises at least one guide groove extending inside the coupling device.

6. The medical care unit according to claim 1, wherein the at least one lip comprises an elastic material.

7. The medical care unit according to claim 2, wherein the power supply bus bars are opposed to the data transmission bus bars at inner surfaces of the hollow bar.

8. The medical care unit according to claim 1, wherein the support is block-shaped and comprises four longitudinal corners, four longitudinal surfaces, and an inner space,
   at least one coupling device extends along a longitudinal corner, and at least one of the longitudinal surfaces of the support adjacent to the coupling device at the longitudinal corner is formed to receive replaceable module components in a modular system.

9. The medical care unit according to claim 8, wherein at least two coupling devices extend along one longitudinal corner,
   an inner coupling device is accessible from the inner space, and
   at least one outer coupling device is accessible from outside the support.

10. The medical care unit according to claim 8, wherein the support comprises a fixing device for fixing at least one of the module components.

11. The medical care unit according to claim 10, wherein the fixing device comprises at least one fixing groove.

12. The medical care unit according to claim 1, wherein the medical care unit is a ceiling mounted support system.

13. The medical care unit according to claim 1, wherein the medical care unit is a ceiling bar.

14. The medical care unit according to claim 1, wherein the medical care unit is a wall bar.

15. A system comprising:
   a medical care unit comprising:
      an oblong support extending along a longitudinal direction, and
      at least one coupling device that extends longitudinally along the support and comprises at least two electric insulated bus bars continuously extending in the coupling device,
      wherein the coupling device is formed as a hollow bar having an opening extending along the longitudinal direction and a cover device provided along the opening of the hollow bar, the cover device comprising at least one lip that narrows or closes the opening, and wherein the bus bars are enclosed by the hollow bar and the cover device; and
   a system component comprising a coupling part that is connected to the coupling device of medical care unit.

16. The system of claim 15, wherein the coupling part of the system component
   comprises at least two contact parts being insulated from each other,
   comprises an insulating body that electrically insulates the contact parts from each other, and
   is adapted to be coupled with the coupling device, and
the contact parts electrically contact the bus bars in a state in which the coupling part is coupled with the coupling device, and are slidable along the bus bars.

17. The system according to claim 15, wherein the coupling device is provided with a counter fixing part designed to engage with the coupling part.

* * * * *